(12) United States Patent
Burgi et al.

(10) Patent No.: US 7,711,221 B2
(45) Date of Patent: May 4, 2010

(54) OPTICAL DEVICE AND SYSTEM AND METHOD FOR FABRICATING THE DEVICE

(75) Inventors: Lukas Burgi, Zurich (CH); Guy Voirin, Courgevaux (CH); Ross Stanley, Epalinges (CH); Jurgen Sochtig, Wettswil (CH)

(73) Assignee: CSEM Centre Suisse D'Electronique Et De Microtechnique SA, Neuchatel (CH)

( * ) Notice: Subject to any disclaimer, the term of this patent is extended or adjusted under 35 U.S.C. 154(b) by 271 days.

(21) Appl. No.: 12/004,160

(22) Filed: Dec. 20, 2007

(65) Prior Publication Data

US 2008/0181279 A1 Jul. 31, 2008

Related U.S. Application Data

(60) Provisional application No. 60/877,213, filed on Dec. 27, 2006.

(51) Int. Cl.
*G02B 6/42* (2006.01)
*G02B 6/30* (2006.01)
*G02B 6/12* (2006.01)

(52) U.S. Cl. .............................. 385/30; 385/14; 385/49

(58) Field of Classification Search ........................ None
See application file for complete search history.

(56) References Cited

U.S. PATENT DOCUMENTS 5,907,160 A 5/1999 Wilson et al.

6,472,817 B1 10/2002 Kawase
6,704,335 B1 3/2004 Koyama et al.

FOREIGN PATENT DOCUMENTS

JP 07022705 A * 1/1995

OTHER PUBLICATIONS

Ohmori, Y. et al.: "Realization of Polymeric Optical Integrated Devices Utilizing Organic Light-Emitting Diodes and Photodetectors Fabricated on a Polymeric Waveguide, IEEE Journal of Selected Topics in Quantum Electronics 10, p. 70, 2004".
Lin, Y.-Y et al. "Integration of polymer light-emitting diodes and polymer waveguide on SI substrate", Applied Physics Letters 89, 063501, 2006.

* cited by examiner

*Primary Examiner*—Omar Rojas
(74) *Attorney, Agent, or Firm*—Weingarten, Schurgin, Gagnebin & Lebovici LLP

(57) ABSTRACT

The present invention discloses an optical device able to luminesce, whereby the optical device comprises, inter alia, a luminescent source that is directly or indirectly mechanically coupled to a low-order mode waveguide, such that light emitting from the luminescent source is optically coupled into the low-order mode waveguide. In embodiments of the invention, the distance D between point sources of the luminescent source and the waveguide is about equal to or smaller than the decay length of the exponential tails of the modes supported by the waveguide, thereby obtaining an optical coupling efficiency of at least 3%. Additional and alternative embodiments are claimed and disclosed.

17 Claims, 8 Drawing Sheets

OPTICAL DEVICE AND SYSTEM AND METHOD FOR FABRICATING THE DEVICE

This application claims priority to U.S. Prov. Pat. Appln. No. 60/877,213 filed Dec. 27, 2006.

The present invention claims priority from U.S. provisional patent application 60/877213, filed on Dec. 27, 2006, the application which is incorporated herein by reference in its entirety.

FIELD OF THE INVENTION

The present invention generally relates to an optical device, system and method according to the preambles of the independent claims that are proposed.

BACKGROUND OF THE INVENTION

Using organic light emitting diodes (OLEDs) as monolithically integrated luminescent source in integrated optical devices might be beneficial in many applications for the following reasons: First, OLEDs can be fabricated by purely additive low-temperature processes such as ink-jet printing and can thus be easily integrated onto almost any substrate. Second, they are ultra-thin and thus offer the potential for substantial space saving. Third, via chemical modification of the OLED's light emitting molecule(s) the emission spectrum can be tuned over a wide range of the optical spectrum. Fourth, they are compatible with flexible polymeric substrates. Finally, due to their simple device architecture and processing scheme they hold the promise for low-cost fabrication and integration.

A major challenge pertaining to OLEDs is the coupling of the light emitted therefrom into a low-order mode (less than 20 modes) supporting waveguide. Various publications teach how light emitted from an OLED may be optically coupled into a waveguide. However, implementations of these publications are not suitable for the coupling of light into a waveguide in low-order modes.

U.S. Pat. No. 5,907,160 for example, which is incorporated herein by reference in its entirety, discloses a thin film organic light emitting diode with edge emitter waveguide comprising, in sequence, a substrate, a waveguide, an anode, a hole transport layer, an electroluminescent layer, and a cathode. Voltage applied between the anode and cathode causes the electroluminescent layer to emit light through the hole transport layer and the anode into the waveguide where the light is internally reflected within the waveguide and propagates through the length of the waveguide to be emitted through the edge of the waveguide.

U.S. Pat. No. 6,472,817, which is incorporated herein by reference in its entirety, discloses an organic light emitting device having a first electrode and a transparent electrode with an organic light emitting layer therebetween; characterized by a waveguide provided on the opposite side of the transparent electrode compared to the organic light emitting layer. In addition, U.S. Pat. No. 6,472,817 also discloses a device incorporating at least two such organic light emitting devices so as to provide a pulsed modulation output or a multi-color output.

U.S. Pat. No. 6,704,335, which is incorporated herein by reference in its entirety, discloses an edge-emitting type light-emitting device that comprises an organic light-emitting layer, a pair of electrode layers for applying an electric field to the organic light-emitting layer, and an optical waveguide which transmits light emitted from the organic light-emitting layer to the edge. The optical waveguide disclosed in U.S. Pat. No. 6,704,335 further comprises a core layer mainly transmitting light, and cladding layers having a refractive index lower than that of the core layer. The core layer may be a layer different from the organic light-emitting layer or may comprise the organic light-emitting layer. A grating is formed in the core layer or in the boundary area between the core layer and the cladding layer. A light-emitting device may comprise an optical fibre section. Another embodiment may comprise a defect and a grating having a one-dimensional periodic refractive index distribution and constituting a photonic band gap. However, implementations of teachings disclosed in U.S. Pat. Nos. 5,907,160, 6,472,817 and 6,704,335 induce waveguide losses caused by the presence of the OLED itself. Accordingly, implementations of the above-mentioned US patents fail to couple light emitted from the OLEDs into a low-order mode waveguide.

Further, Y. Ohmori et al. disclose in the publication "Realization of Polymeric Optical Integrated Devices Utilizing Organic Light-Emitting Diodes and Photodetectors Fabricated on a Polymeric Waveguide, IEEE Journal of Selected Topics in Quantum Electronics, Vol. 10, p. 70, No. 1, 2004", which is incorporated herein by reference in its entirety, a 45° cut mirror at one end of a waveguide of 70 μm core size to reflect the light from the OLED on top of the waveguide into the core. However, since the optical power that can be coupled scales with the core size of the waveguide, the approach disclosed by Y. Ohmori et al. yields insufficient power in the case of low-order mode waveguides.

Y.-Y. Lin et al. disclose in their publication "Integration of polymer light-emitting diodes and polymer waveguide on SI substrate", Applied Physics Letters 89, 063501, 2006", which is incorporated herein by reference in its entirety, the introduction of a diffuser layer into the waveguide to couple light from an OLED into a coplanar waveguide. However, diffuser particles are difficult to integrate into low-order mode waveguides of thicknesses equal to the wavelength of the light they guide. Furthermore, multiple scattering events constitute a major problem in the case of low-order mode waveguides and limit the achievable coupling efficiency considerably.

SUMMARY OF THE INVENTION

The present invention discloses an optical device that is able to luminesce and which comprises, inter alia, a luminescent source; a low-order mode waveguide; and a substrate, whereby the waveguide is mechanically coupled to the substrate. The optical device is characterized in that the distance D between point sources of the luminescent source and the waveguide is equal to or smaller than the decay length of the exponential tails of the modes supported by the waveguide, thereby ensuring that the luminescent source and the low-order mode waveguide are optically coupled.

In embodiments of the invention, the optical device further comprises a spacer layer that is sandwiched between the luminescent source and the waveguide to reduce modal loss of light propagating in the part of the waveguide that is located underneath the luminescent source.

In embodiments of the invention, the distance D is equal or smaller than 5 μm; preferably equal or smaller than 500 nm; and more preferably equal or smaller than 150 nm.

In embodiments of the invention, the luminescent source is monolithically integrated with the waveguide or with the spacer layer.

In embodiments of the invention, the thickness of the waveguide ranges from 10 nm to 10 μm; preferably from 50 nm to 1 μm; and more preferably from 100 nm to 500 nm.

In embodiments of the invention, the thickness of the spacer layer ranges from 5 nm to 5 µm; preferably from 10 nm to 300 nm; and more preferably from 20 nm to 150 nm.

In embodiments of the invention, the thickness of said luminescent source is equal or smaller than 100 µm, preferably equal or smaller than 10 µm; and more preferably equal or smaller than 1 µm.

In embodiments of the invention, the low-order mode refers to less than 20 modes; and preferably to less than 5 modes.

In embodiments of the invention, the waveguide comprises one or more grating structures.

In embodiments of the invention, the coupling of efficiency between the luminescent source and the waveguide is about equal to or at least 3%, and preferably about equal to or at least 10%.

The present invention further discloses an optical system comprising at least one optical device, wherein the at least one luminescent source is evanescently mechanically coupled to a structure that comprises at least one low-order mode waveguide and at least one substrate.

In embodiments of the invention, at least one spacer layer is mechanically coupled to the structure and positioned between that at least one low-order mode waveguide and the at least one luminescent source.

In embodiments of the invention, the optical system comprises a plurality of waveguides provided on the at least one substrate, the plurality of waveguides being spaced apart from each other.

In embodiments of the invention, the optical system comprises at least one sensing area and at least one detector, whereby the at least one sensing area and detector are substantially aligned with respect to the at least one luminescent source, respectively.

The present invention further discloses a method for manufacturing the optical device and the optical system, wherein a substrate is provided and a low-order mode waveguide is provided on the substrate. A luminescent source is mechanically and evanescently coupled in a direct or indirect manner to the low-order mode waveguide; wherein the distance D between point sources of the luminescent source and the waveguide is equal to or smaller than the decay length of the exponential tails of the modes supported by the waveguide to ensure that the luminescent source and the low-order mode waveguide are optically coupled.

In embodiments of the invention, the method comprises providing a spacer layer between the low-order mode waveguide and the luminescent source to reduce modal loss of light propagating in the part of said waveguide that is located underneath the luminescent source.

In embodiments of the invention, the method comprises providing a grating structure underneath the luminescent source or at a distance $D_{GS}$ from the outermost edge of the luminescent source and the spacer layer.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying Figures, (or simply "FIGs."), wherein.

Figure 1A:
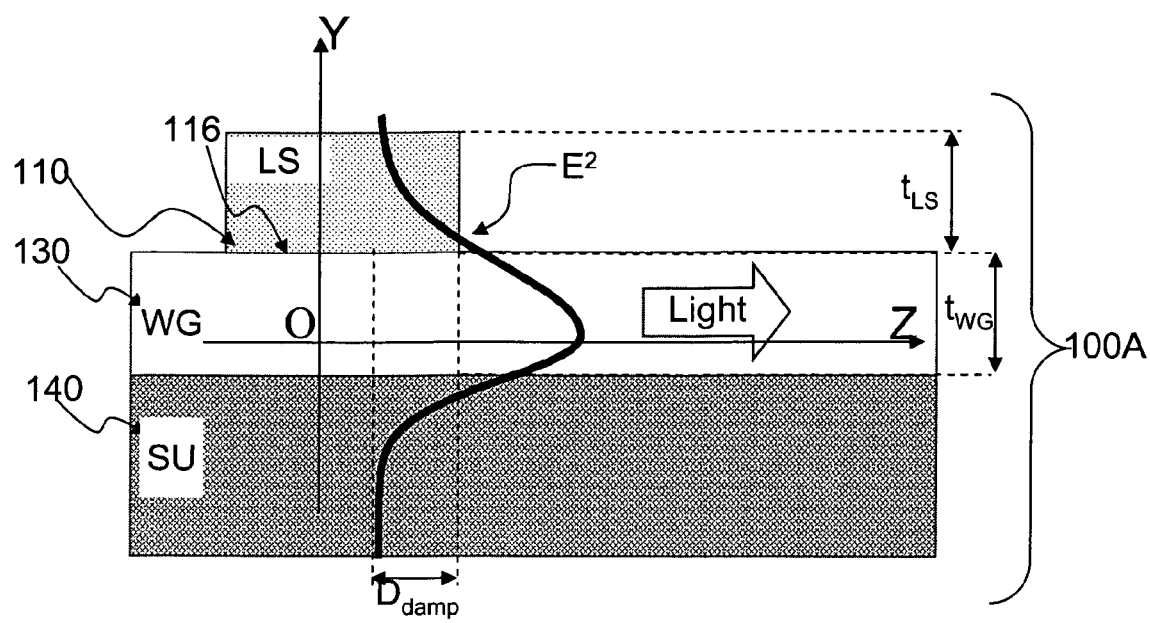
FIG. 1A is a schematic block diagram illustration of a side view of an optical device adapted to couple light emitted from a luminescent source into a low-order mode waveguide, according to an embodiment of the invention.

The drawings taken with description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous elements.

DESCRIPTION OF EMBODIMENTS OF THE INVENTION

The present invention discloses an optical device configured in a manner that enables to couple light emitted from a luminescent source such as, for example, an organic light emitting diode (OLED), into a low-order mode waveguide. Correspondingly, the present invention enables the usage of luminescent sources in association with waveguides that support only low-order modes. The term "low-order mode" as used herein may refer, in some embodiments of the invention, to less than 20 modes. In some preferred embodiments of the invention, the term "low-order mode" may refer to less than 5 modes. Correspondingly, a low-order waveguide may refer to a waveguide that supports the propagation of light therein in less than 20 modes, and in some preferred embodiments of the invention, in less than 5 modes.

The terms "right", "left", "bottom", "underneath", "below", "lowered", "low", "top", "above", "elevated" and "high" as well as grammatical variations thereof as optionally used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or be similarly modified. Accordingly, it will be appreciated that terms such as "bottom", "below", "underneath" "top" and "above" may be used herein for exemplary purposes only, to illustrate the relative positioning or placement of certain components, to indicate a first and a second component or to do both.

Figure 1B:
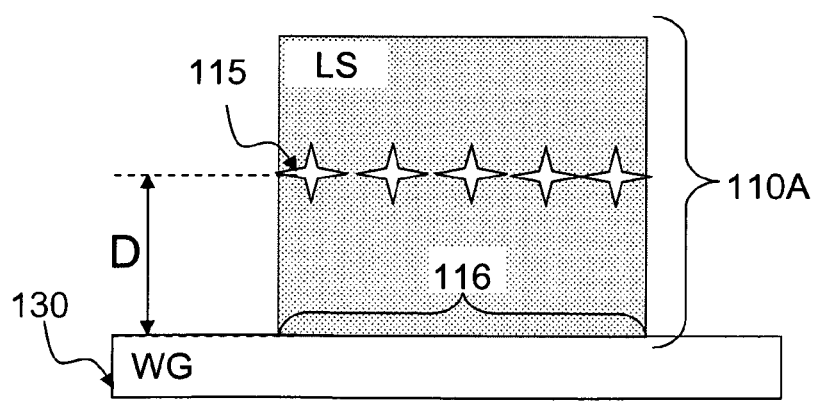
FIG. 1B is a schematic block diagram illustration of a side view of a luminescent source and the individual light sources thereof, the luminescent source being coupled to the low-order mode waveguide, according to an embodiment of the invention.

Referring now to FIG. 1A and to FIG. 1B, an optical device 100 according to some embodiments of the invention, may include, for example, a luminescent source (LS) 110 mechanically evanescently coupled directly or indirectly to a waveguide (WG) 130, which is a low-order mode WG. LS 110 may be realized, for example, by a photoluminescent, an electroluminescent, or a chemiluminescence LS or any other LS, e.g., as known in the art. Therefore, LS 110 may be realized by means of an OLED for example.

Overall thickness $t_{LS}$ of LS 110 may be about equal or be smaller than, e.g., 100 μm. In some preferred embodiments of the invention, the thickness $t_{LS}$ of LS 110 may be about equal or be smaller than 10 μm. In some more preferred embodiments of the invention, LS 110 may have a thickness $t_{LS}$ that is about equal or smaller than, for example, 1 μm.

In an embodiment of the invention, LS 110 is evanescently mechanically coupled to WG 130. The coupling of LS 110 to WG 130 may be accomplished, e.g., as known in the art. In one embodiment of the invention for example, LS 110 may be monolithically integrated to WG 130, i.e., LS 110 may be integrally formed with WG 130.

Further, WG 130 may be mechanically coupled to a substrate (SU) 140. The mechanical coupling of WG 130 to SU 140 may be accomplished, e.g., as known in the art.

LS 110 may be mechanically coupled to WG 130 in a manner such that at least some of the light emitted by LS 110 is optically coupled into the low-order mode WG 130. WG 130 may have a thickness $t_{WG}$ that only supports propagation of light in low-order modes. For example, WG 130 may have a thickness $t_{WG}$ ranging from 10 nm to 10 μm. In some preferred embodiments of the invention, WG 130 may have a thickness $t_{WG}$ ranging, for example, from 50 nm to 1 μm. In some more preferred embodiments of the invention, WG 130 may have a thickness $t_{WG}$ ranging, for example, from 100 nm to 500 nm.

Figure 2A:
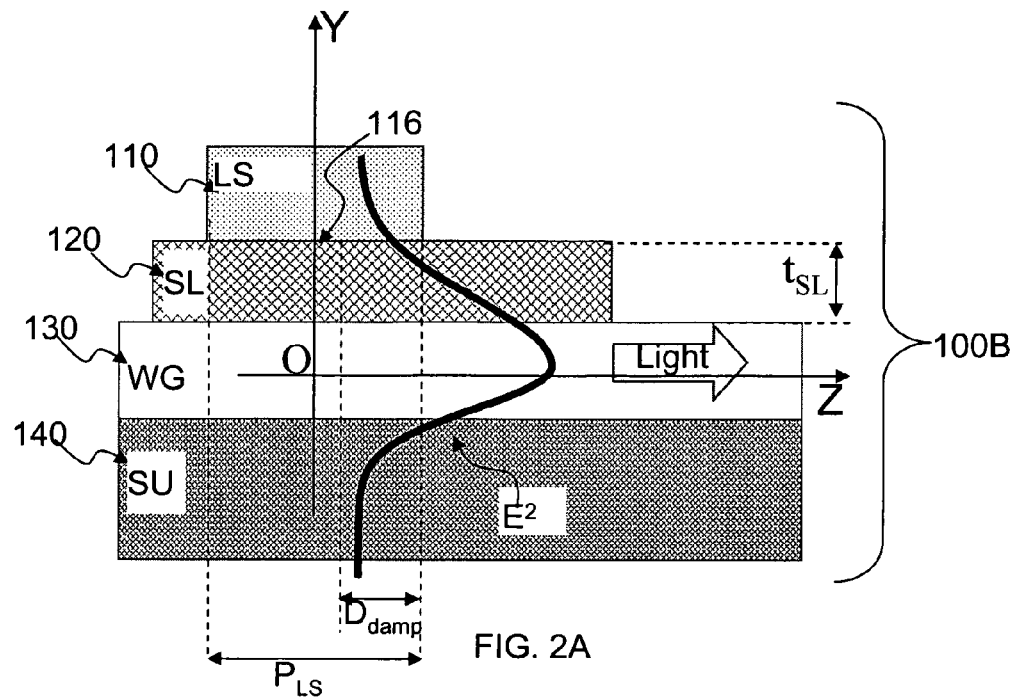
FIG. 2A is a schematic block diagram illustration of a side view of an optical device adapted to couple light emitted from a luminescent source into a low-order mode waveguide, the optical device comprising a spacer layer, according to another embodiment of the invention.
Figure 2B:
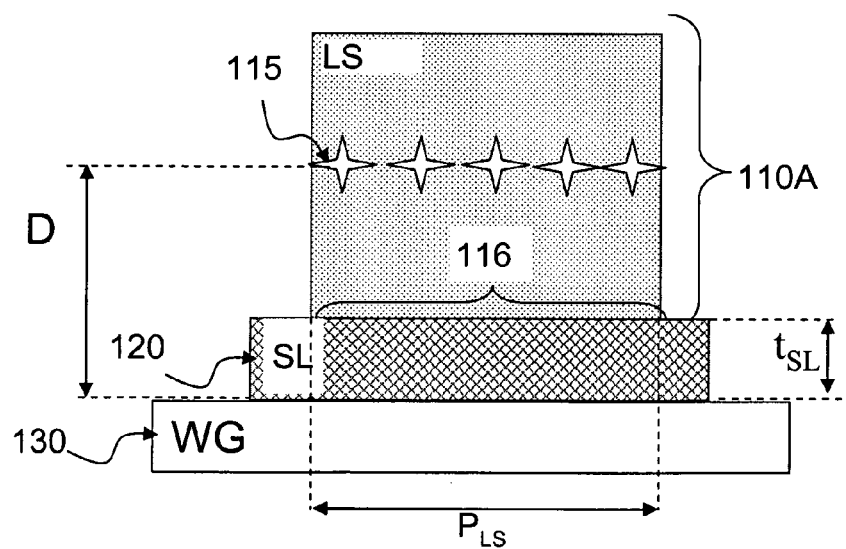
FIG. 2B is a schematic block diagram illustration of a side view of the luminescent source and the individual light sources thereof, the luminescent source being coupled through the spacer layer, according to an embodiment of the invention.

Further reference is now made to FIG. 2A and to FIG. 2B. The distance D between the light emitting zone(s) of LS 110 from WG 130 is an additional parameter that may have an influence on the coupling of light from LS 110 into WG 130.

For exemplary purposes only, the light emitting zones are herein schematically indicated as an assembly of point sources 115, which may be embodied, for example, by dipoles and/or quadrupoles and/or by any other electrical pole arrangement. In any event, point sources 115 may be arranged substantially in one plane, as is schematically indicated in FIG. 1B. Alternatively, point sources 115 may be arranged in various planes and/or may be positioned in LS 110 in a substantially random manner (not shown).

It should be noted that the rate at which point sources 115 can emit light into a given mode of WG 130 is proportional to the square of the electric field distribution $E^2$ of the given mode at the location of point sources 115. The square of the electric field distribution for the mode of order zero is schematically illustrated in FIGS. 1A and 2A by means of curve $E^2$. Outside the waveguide (e.g., WG 130) itself, the electric field distribution E decays exponentially with an increase of the distance from the waveguide (e.g., WG 130). It may therefore be advantageous that the distance D between point sources 115 and WG 130 is about equal or smaller than the decay length of the exponential tails of the modes supported by WG 130, in order to ensure that light emitted from LS 110 is optically coupled into low-order mode WG 130. Suitable distances D between WG 130 and point sources 115 of LS 110 may be about equal to or be smaller than, for example, 5 μm. In some preferred embodiments of the invention, distance D may be about equal or be smaller than, for example, 500 nm. In some more preferred embodiments of the invention, D may be about equal or be smaller than, for example, 150 nm.

In general, the efficiency of transfer of optical power from LS 110 into a waveguide such as, for example, WG 130, may be referred to, for example, in accordance to the term "coupling efficiency" and may be expressed as the ratio between the optical power in all the modes of the waveguide (e.g., WG 130) and the total optical power emitted by the point source(s) 115.

Light propagating in LS 110 may be subjected to other and/or additional obstacles that may cause modal loss in the light propagating in an optical device such as optical device 100. For example, light generated and propagating in a waveguide such as, for example, WG 130, may be strongly influenced by the presence of LS 110 itself, due to optically dissipative and/or metallic layers of which LS 110 may comprise. A metallic layer may, for example, give rise to modal loss of light propagating in WG 130 due to a) surface plasmons and/or b) absorption losses and/or c) quenching, which is hereinafter referred to as non-radiative damping. In any event, modal loss of light propagating in WG 130 is in some embodiments of the invention substantially reduced and lower than, e.g., 100 cm$^{-1}$. In some preferred embodiments of the invention, modal loss of less than, e.g., 10 cm$^{-1}$, is achieved.

The above-mentioned requirements of efficient transfer of optical power from LS 110 into WG 130 imply, inter alia, that LS 110 ought to be as close as possible to a waveguide (e.g., WG 130) and/or that a waveguide (e.g., WG 130) should be near cutoff wavelength. Near cutoff, the waveguide modes are largely outside the waveguide and will overlap with the modes emitted from LS 120 even when the waveguide is relatively distant from LS 110.

Reference is now made to FIG. 2A and FIG. 2B. By sandwiching in some embodiments of the invention, a spacer layer (SL) 120 between LS 110 and WG 130, modal losses may be tuned in an optical device such as optical device 100, as outlined hereinafter. LS 110 may be monolithically integrated with SL 120.

A thicker SL 120 reduces the modal losses in WG 130 that are induced by the very presence of the LS 110, but also decreases coupling efficiency since it decreases the evanescent coupling (i.e., increases the distance) between the light-emitting zone(s) of LS 110 and WG 130. A thinner SL 120 acts the opposite way, i.e., increases the coupling efficiency, but may also increase modal losses in WG 130. In fact, it turns out from simulations that the modal losses induced by the presence of LS 110 as well as the coupling efficiency between LS 110 and e.g., WG 130 both decrease approximately exponentially with increasing thickness of SL 120. Thus, at first sight, it seems that nothing is to be gained by introducing SL 120. From a practical point of view, however, the introduction of SL 120 is advantageous, as outlined herein with additional reference to FIG. 3.

Figure 3:
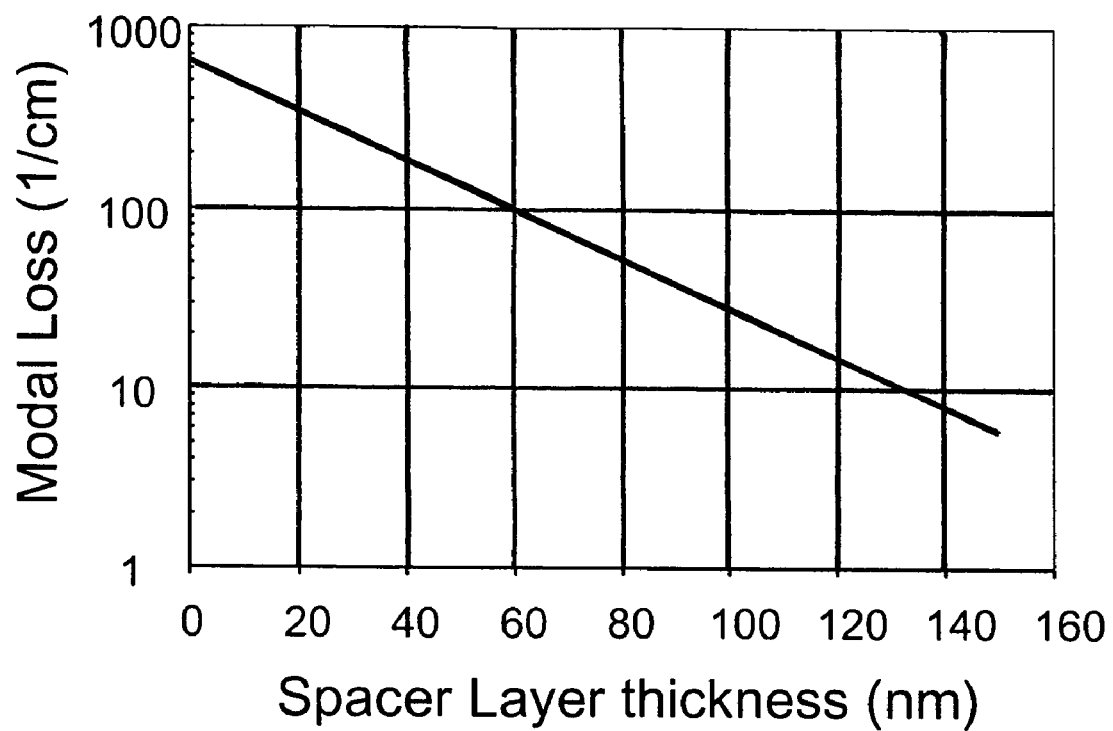
FIG. 3 shows a graph that schematically depicts the calculated modal loss of light as a function of the thickness of the spacer layer, wherein the modal loss is calculated for the part in the low-order mode waveguide that is located underneath the luminescent source, according to an embodiment of the invention.

It should be noted that for exemplary purposes only, the modal loss depicted in FIG. 3 as a function of the thickness $t_{SL}$ of SL 120, is calculated for the part ($P_{LS}$) of an OLED's WG 130 that is situated underneath LS 110, whereby the said OLED has approximately the following parameters:
SU 140—material: Glass, n=1.45
WG 130—material: $Ta_2O_5$, n=2.2, thickness $t_{WG}$=200 nm
SL 120—material: $SiO_2$, n=1.45, thickness $t_{SL}$ varied from 0 to 150 nm
Anode of LS 110:—material: ITO, n=1.9723+0.0431 i, thickness=40 nm
Electroluminescent layer of LS 110—material: a polymer, n=1.6, thickness $t_{LS}$=90 nm
Cathode of LS 110—material: Silver, n=0.1248+3.3396 i, thickness=70 nm It should be noted that modal loss as a function of thickness of SL 120 may be calculated for any embodiment of LS 110.

As can readily be seen in FIG. 3, modal losses within the part $P_{LS}$ of WG 130 that is located underneath LS 110, are of the order of 1000 cm$^{-1}$ when no SL 120 is present. This means in this case that the intensity of light guided in WG 130 may be damped over a length of approximately $D_{damp}$=10 μm. In other terms, only light that is coupled into WG 130 within, e.g., 1-2 times a distance $D_{damp}$ from the edge of LS 110 survives, the rest being damped by its proximity to LS 110 before the light reaches the un-damped part of WG 130 (i.e., the part of WG 130 that is not covered by LS 110). This implies that the length of the lower edge 116 of LS 110 must be well defined on a length scale comparable to $D_{damp}$. Ideally, the lower edge 116 is smaller than $D_{damp}$.

Reverting now to FIG. 1A and FIG. 1B, in which optical device 100 does not comprise SL 120, the distance $D_{damp}$ ought to be <<10 μm., i.e. a value which may not be achievable with common deposition techniques used for OLED fabrication such as e.g. ink-jet printing and shadow mask evaporation.

By introducing SL 120 (FIG. 2A and FIG. 2B) having, for example, a thickness of approximately 130 nm, the modal losses in WG 130 are reduced to approximately 10 cm$^{-1}$, which corresponds to a characteristic length of 1 mm. Thusly configured, a shadow mask's (not shown) registration accuracy of 100 μm (a value that is easily achievable with standard OLED processing techniques), is fully sufficient. Correspondingly, the requirement in registration accuracy of the shadow mask for obtaining the corresponding width of LS 110 can be relaxed and enables therefore the practical realization of optical devices in which light emitted from an OLED can be efficiently optically coupled into a low-order mode waveguide.

SL 120 may be made of any suitable material and must be substantially dielectric and must have low-loss properties pertaining to light intensity attenuation. SL 120 also has a refractive index that is smaller than the refractive index of the waveguide (e.g., WG 130) mechanically coupled thereto. SL 120 may have a thickness ranging, for example, from 5 nm to 5 μm. In some preferred embodiments of the invention, SL 120 may have a thickness ranging, for example, from 10 nm-300 nm. In some more preferred embodiments of the invention, SL 120 may have a thickness ranging, for example, from 20 nm to 150 nm.

Figure 4A:
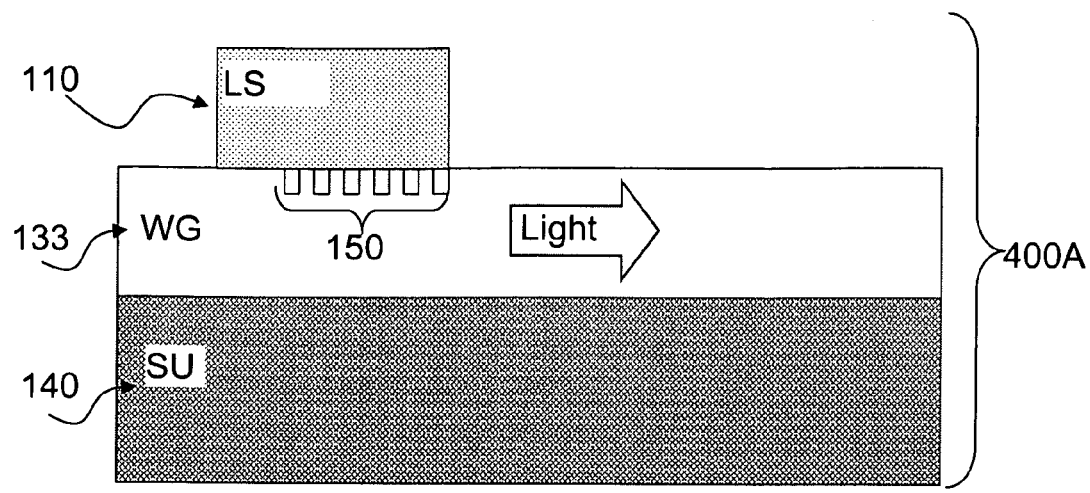
FIG. 4A is a schematic block diagram illustration of a side view of an optical device adapted to couple light emitted from a luminescent source into a low-order mode waveguide, according to an alternative embodiment of the invention.
Figure 4B:
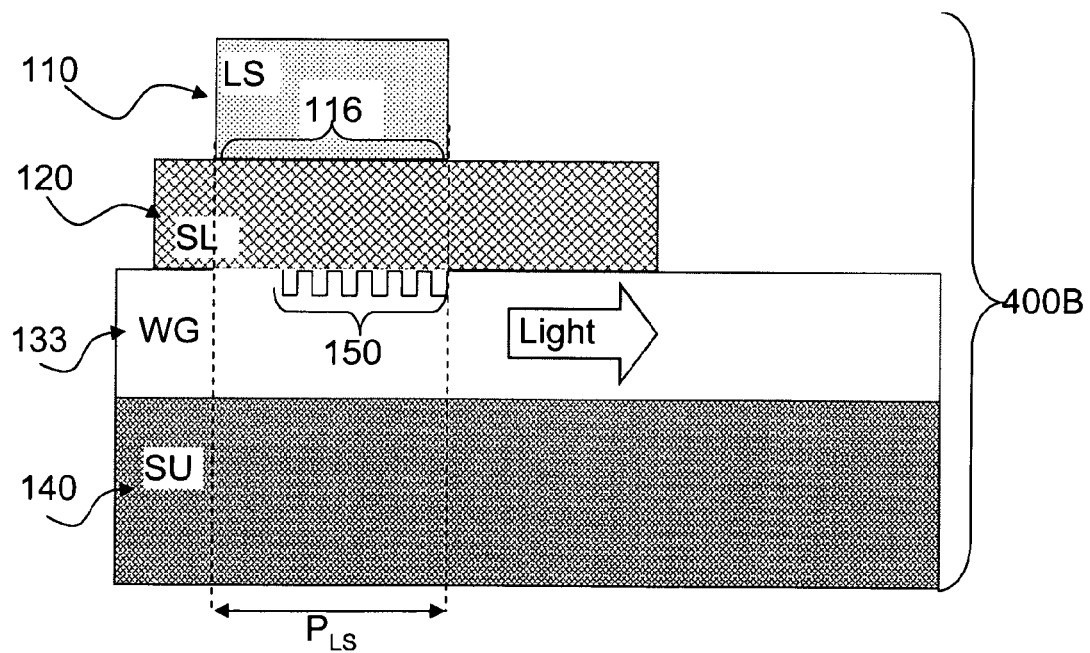
FIG. 4B is a schematic block diagram illustration of a side view of an optical device comprising the spacer layer, the optical device being adapted to couple light emitted from the luminescent source into the low-order mode waveguide of FIG. 4A, according to another alternative embodiment of the invention.

Reference is now made to FIG. 4A and to FIG. 4B. According to some embodiments of the invention, an optical device 400A and 400B may each comprise a WG 133 having an optical grating structure (GS) 150 that is positioned underneath LS 110 (i.e., between WG 133 and LS 110 (FIG. 4A), or between WG 133 and SL 120 (FIG. 4B)). Additionally or alternatively, a grating structure (not shown) may be provided in some embodiments of the invention between SL 120 and LS 110 or between SU 140 and WG 133. The grating structure (e.g. GS 150) is provided to modify at least some of the light entering WG 133. Such modification of light may comprise, for example, narrowing the spectra and/or modifying the polarization of light at the inlet to WG 133, i.e., at the interface between WG 133 and LS 110. Such modifications may, for example, cause an increase of the coupling efficiency between LS 110 and WG 133. Correspondingly, in some embodiments of the invention, a coupling efficiency of about or at least 3% is achieved. In some preferred embodiments of the invention, a coupling efficiency of about or at least 10% is achieved.

In general, it should be noted that in case no spacer layer is present, a grating structure may be grafted into a substrate before a waveguide is deposited, or into the waveguide before a luminescent source is deposited, or into the luminescent source before a cathode is deposited. However, in case a spacer layer is provided, a grating structure may be grafted into a substrate before a waveguide is deposited, or into the waveguide before the spacer layer is deposited, or into the spacer layer before the luminescent source is deposited, or into the luminescent source before a cathode is deposited.

In some embodiments, optical device 400B additionally comprises SL 120 (FIG. 4B) sandwiched between LS 110 and WG 133.

Figure 5A:
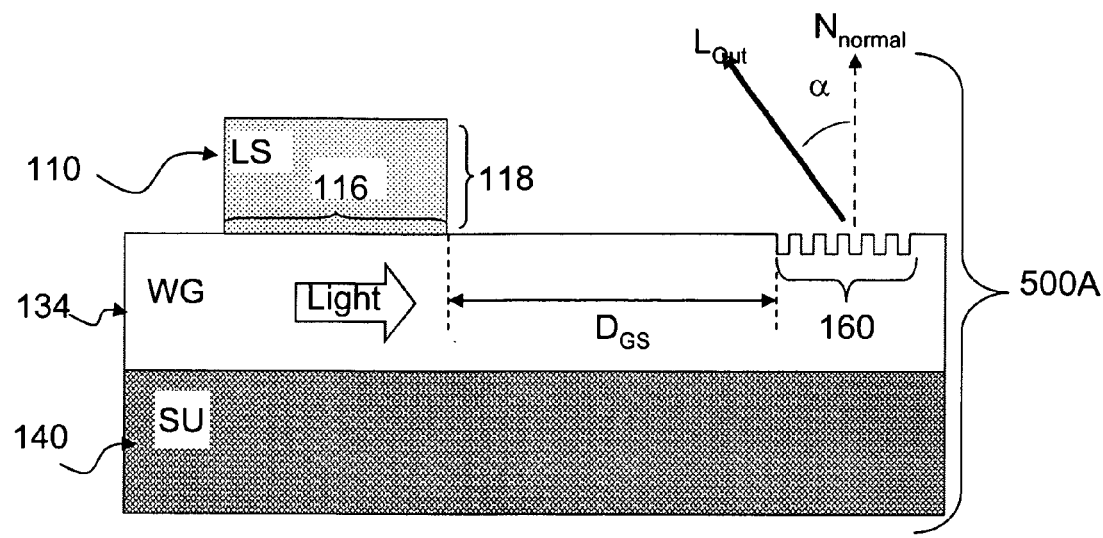
FIG. 5A is a schematic block diagram illustration of a side view of an optical device adapted to couple light emitted from the luminescent source into a low-order mode waveguide, according to yet another embodiment of the invention.
Figure 5B:
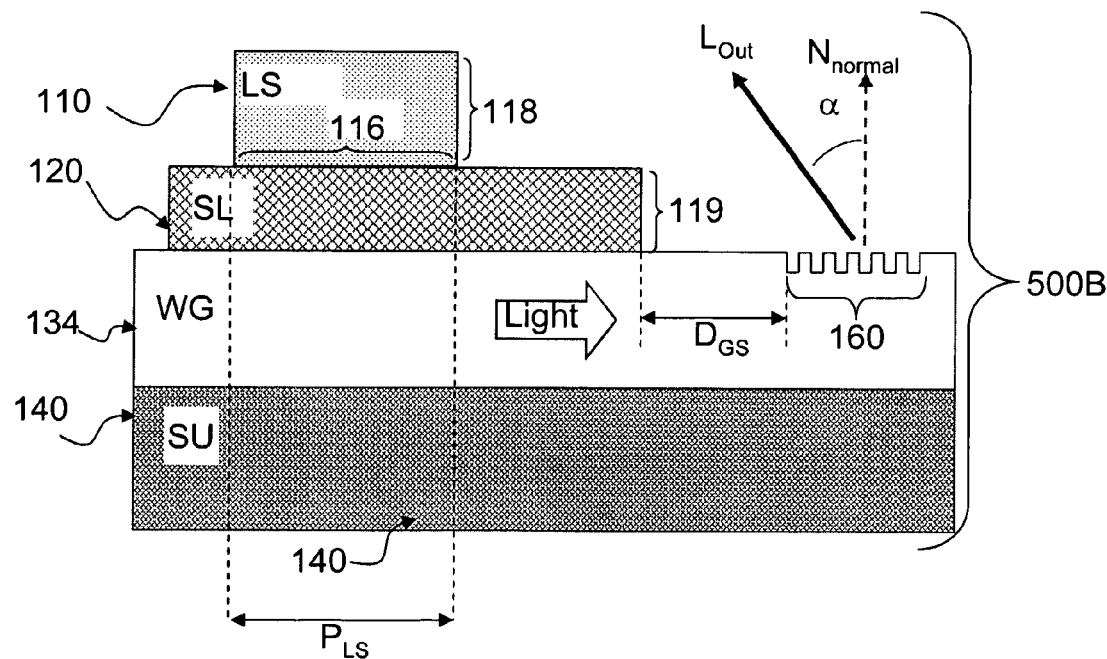
FIG. 5B is a schematic block diagram illustration of a side view of an optical device comprising the spacer layer, the optical device being adapted to couple light emitted from the luminescent source into the low-order mode waveguide of FIG. 5A, according to yet another alternative embodiment of the invention.

Additional reference is now made to FIG. 5A and FIG. 5B. According to some embodiments of the invention, an optical device 500A and an optical device 500B may each comprise a WG 134 having an out-coupling GS 160 that couples light out from the WG. Optical device 500B may comprise SL 120 positioned between WG 134 and LS 110. The first grate of GS 160 (viewed from the direction of the propagation of light in WG 134) may be located at a distance $D_{GS}$ from the outermost edge of the LS 110. Angle "α" schematically illustrates an out-coupling angle of the light ($L_{Out}$) emitting from WG 134, whereby angle "α" is measured with respect to a normal "$N_{normal}$" of WG 134. The said angle "α" is ideally given by the following equation:

$$n_c \sin\alpha = N - \frac{\lambda}{\Lambda} \qquad (1)$$

wherein "$n_c$" represents the refractive index of the layer cladding WG 134 at its output. Correspondingly, "$n_c$" may represent the refractive index of air. "N" represents the effective refractive index of the waveguide mode in WG 133, "λ" the wavelength(s) of the light propagating in WG 133, and "Λ" the grating period of GS 160.

GS 150 as well as GS 160 may be fabricated, e.g., as known in the art. For example, GS 150 and GS 160 may be fabricated by dry or wet etching techniques. Further GS 150 and GS 160 may be fabricated by replication from molds or Ni-maters in case that WG 133 and WG 134 are made of polymeric substrates or UV cast materials.

GS 150 as well as GS 160 may be grafted before the deposition of WG 133 and WG 134 into SU 140. Alternatively, GS 150 and GS 160 may be grafted into WG 133 and WG 134, respectively, after their deposition onto SU 140.

According to some embodiments of the invention, a grating period Λ of GS 150 and GS 160 may range, for example, from 100 nm to 1 µm. In some preferred embodiments of the invention, a grating period Λ of GS 150 and GS 160 may range, for example, from 200 nm to 500 nm. According to some embodiments of the invention, the depth of GS 150 and GS 160 may range, for example, from 1 nm to 500 nm. In some preferred embodiments of the invention, the depth of GS 150 and 160 may range, for example, from 5 nm to 50 nm.

Figure 6A:
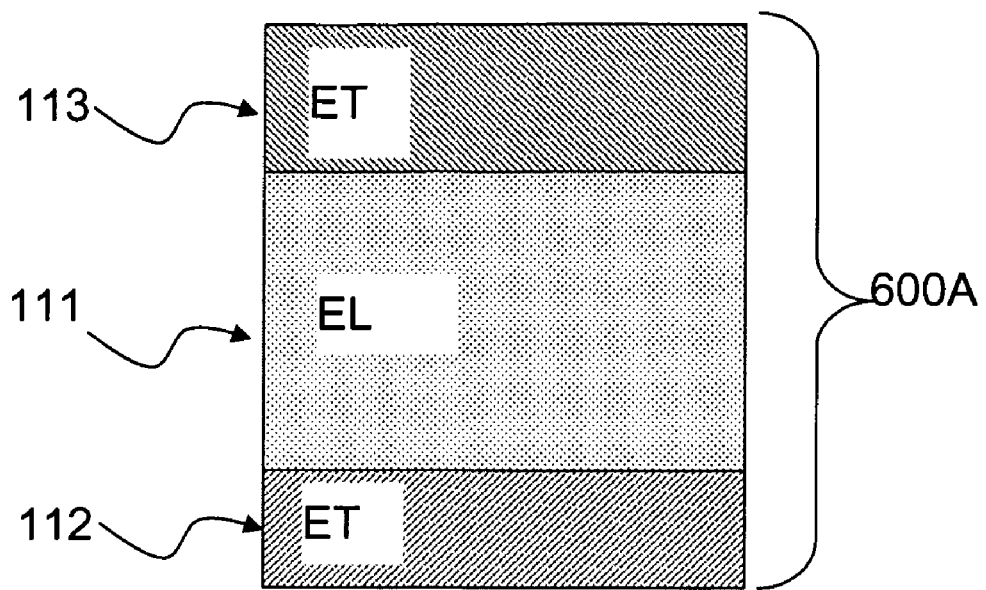
FIG. 6A is a detailed schematic block diagram illustration of a side view of an embodiment of the luminescent source.

Further reference is now made to FIG. 6A. As already indicated herein, LS 110 may be implemented by means of electroluminescence (light emitting capacitor). The embodiment thereof is schematically indicated by means of LS 600A, which comprises at least a first electrode layer (ET) 112, a second electrode layer (ET) 113 and at least one electroluminescent layer (EL) 111 sandwiched between ET 112 and ET 113. In addition, LS 110 may also include at least one dielectric layer (not shown), situated and covering at least some of the interface between ET 112 and EL 111, or the interface between ET 113 and EL 111. For exemplary purposes only, ET 112 is hereinafter referred as to the electrode that is positioned closer to a waveguide (e.g., WG 130) than ET 112. Correspondingly, ET 113 may either be mechanically coupled to WG 130 or to SL 120.

In the said embodiment, the electrode that is closer to e.g., WG 130 must be at least partially transparent for the light produced by EL 111. This may be achieved by using a suitable material that is substantially transparent or semitransparent for the said light. Such materials may be, for example, conducting oxides, semi-transparent thin metal films, conducting polymer layers as electrodes and the like.

The following is an example of how electroluminescense may be generated. For example, by applying an alternating voltage to ET 112 and ET 113, EL 111 is subjected to high alternating electrical fields (e.g., $10^6$ V/cm), which in turn causes the excitation of, e.g., phosphors in EL 111. The dielectric layer (not shown) should minimize flow of electrical current through LS 110. In some embodiments of the invention, at least one insulating layer (not shown) may be incorporated either between ET 112 and EL 111 or between ET 113 and EL 111. ET 112. If the insulating layer is provided between ET 112 and EL 111 (i.e., the side that is close to the waveguide), the insulating layer must be at least partially transparent for the light produced by EL 111. The insulating layer ensures that minimal current is flowing through the device.

Reference is again made to FIG. 6A. LS 110 may be implemented by an OLED. Again, the lower electrode ET 112, i.e. the one in contact with the spacer layer, must be at least partially transparent for the light produced by the OLED. This may be achieved by using transparent conducting oxides, semi-transparent thin metal films, or conducting polymer layers as electrodes. Additional charge transport layers can be inserted between the electroluminescent layer(s) and the cathode and between the electroluminescent layer(s) and the anode. Suitable thicknesses for all these layers are in the range of 1 nm to 1 µm. Preferred are thicknesses in the range of 5 nm to 200 nm.

In the event that LS 600A is an OLED, suitable materials for ET 112 of the OLED may include, for example, substantially transparent conducting oxides, semi-transparent thin metal films, or conducting polymer layers as electrodes.

It should be noted that in the embodiments in which LS 600A is implemented by an OLED, charge transport layers (not shown) may be sandwiched or inserted between EL 111 and ET 112, as well as between EL 111 and ET 113. In embodiments of the invention, the thickness for the charge transport layers may range, for example, from 1 nm to 1 µm. In preferred embodiments of the invention, the thickness of the charge transport layers may range from 5 nm to 200 nm.

It should be noted that LS 600A as schematically illustrated in FIG. 6A is not realizable, since a real-world LS, the electroluminescent layer must cover the edges of the electrodes in order to avoid electrical short circuits between them. In other words all the layers—especially absorptive electrodes—must be patterned and aligned with respect to each other at a spatial resolution that is significantly better than $D_{damp}$.

Figure 6B:
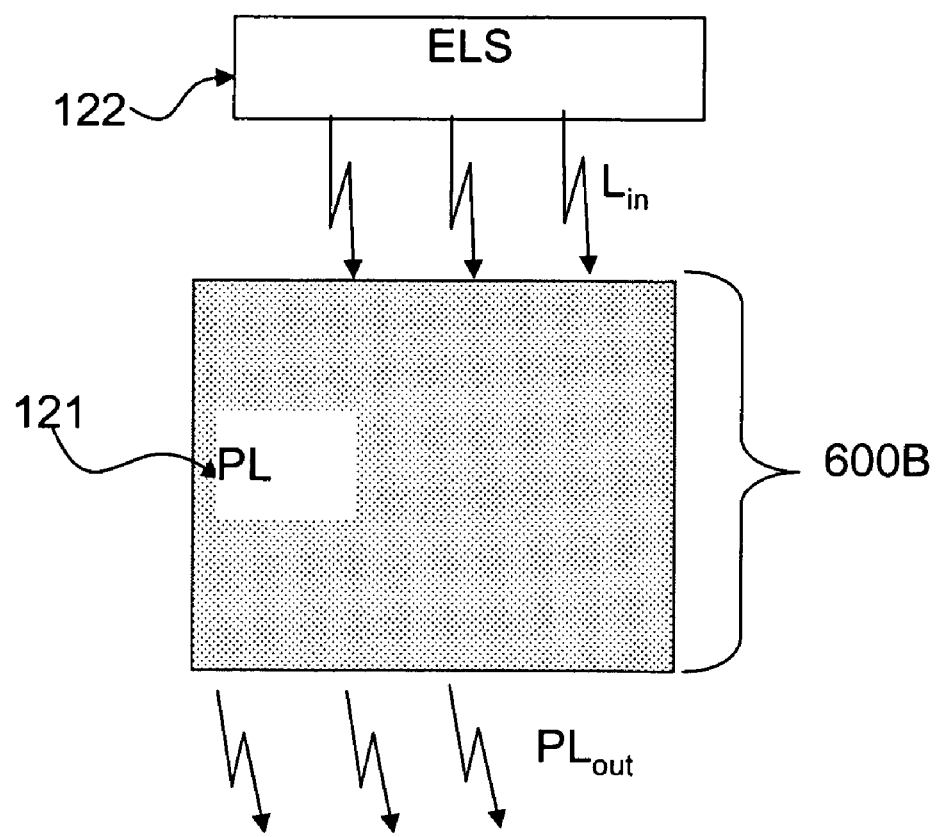
FIG. 6B is a detailed schematic block diagram illustration of a side view of an external light source operatively associated to another embodiment of the luminescent source.

Reference is now made to FIG. 6B. In an alternative embodiment of the invention, LS 110 may be implemented by means of a photoluminescent layer. The alternative embodiment is schematically illustrated by means of LS 600B, which comprises at least one photoluminescent layer (PL) 121 that emits light when being excited by irradiation with photons. Correspondingly, if PL 121 is suitably subjected to light $L_{in}$ emitted from an external light source (ELS) 122, PL 121 may absorb some of the light $L_{in}$ and emit as a result thereof light $PL_{out}$.

ELS 122 may be any suitable external light source such as, for example, an ultraviolet lamp, whereby some or all of the wavelength(s) of light $L_{in}$ differ from $PL_{out}$. In some embodiments of the invention, the spectrum of light $PL_{out}$ may shift towards longer wavelengths with respect to the absorption spectrum of PL 121.

In some embodiments of the invention, some of the photoluminescent material(s) of PL 121 may be identical to the electroluminescent material(s) of EL 111.

The thickness of PL 121 may be about equal or be smaller than 100 µm. In some preferred embodiments of the invention, the thickness of PL 121 may be about equal or be smaller than 10 µm. In some more preferred embodiments of the invention, the thickness of PL 121 may be about equal or be smaller than 1 µm.

Reference is now again made to FIG. 5B. An optical device according to the embodiment schematically illustrated in FIG. 5B may be manufactured as outlined hereinafter. First, substrate (140) may provided, whereupon low-order mode waveguide (e.g. WG 133) is provided on substrate 140. Thereafter, luminescent source 110 is manufactured on said substrate 140, wherein as already mentioned hereinabove, the distance D between point sources 115 of luminescent source 110 and the waveguide (e.g. WG 133) should be about equal to or smaller than the decay length of the exponential tails of the modes supported by a waveguide (e.g., WG 130) to ensure that luminescent source 110 and, e.g., low-order mode waveguide 130 are optically coupled.

The decay length of the exponential upward tail of the modes supported by the waveguide is ideally given by the following mathematical term:

$$C_1 \cdot \exp(-(Y-Y_1)/a_1) \quad (2)$$

wherein "$C_1$" is a proportionality factor, and "$a_1$" represents the decay length, which depends on the thicknesses of the different elements of the optical device (e.g., optical device 10A), the refractive indices therein, and the wavelength(s) and the mode numbers of a waveguide (e.g., WG 130), and wherein "$Y_1$" represents the position of the interface between a waveguide (e.g. WG 130) and LS 110; or the position between a waveguide and SL 120, relative to an origin "O".

Correspondingly, the decay length of the exponential downward tail is ideally given by the following mathematical term:

$$C_2 \cdot \exp(-(Y_2-Y)/a_2) \quad (3)$$

wherein "$C_2$" is a proportionality factor, and "$a_2$" represents the decay length, which depends on the thicknesses of the different elements of the optical device (e.g., optical device 10A), the refractive indices therein, and the wavelength(s) and the mode numbers in a waveguide (e.g. WG 130), and wherein "$Y_2$" represents the position of the interface between a waveguide (e.g. WG 130) and LS 110; or the position between a waveguide and SL 120, relative to the origin "O".

It should be noted that the value represented by $C_1$ can differ from the value represented by $C_2$. In addition, the value represented by "$a_1$" can differ from the value represented by "$a_2$".

The method further comprises providing spacer layer 120 between low-order mode waveguide (e.g., WG 133) and luminescent source 110 to reduce modal loss of light propagating in the part of the waveguide (e.g. WG 133) that is located underneath luminescent source 110. The method may further comprise providing a grating structure (e.g. GS 150) underneath luminescent source 110s or at a distance $D_{GS}$ from the outermost edge of luminescent source 110 and spacer layer 120. More specifically, SU 140 may be, for example, a 14 mm×57 mm glass substrate onto which a substantially planar single mode WG 130, being 150 nm thick and comprising of $Ta_2O_5$, is sputter deposited in accordance to the method. Further according to the method, substantially parallel to the long sides of SU 140, at 2.25 mm from the substrates SU 140 edge 141, two substantially uniform rectangular out-coupling GS 160 of 312 nm period and 12 nm depth are grafted into SU 140 by means of a photolithographic process and dry etching prior the deposition of $Ta_2O_5$. Next, SL 120 comprising of $SiO_2$ being approximately 130 nm thick is deposited onto SU 140 by plasma-enhanced chemical vapor deposition. At approximately 450° C., a 2 hours annealing step of the $SiO_2$ may follow. Then ET 112 being 30 nm thick and comprising of indium tin oxide layer (ITO), may be magnetron sputtered on top. The ITO may then be lithographically patterned into eight 3 mm wide stripes extending from one of the long edges 4.2 mm towards the center of SU 140. These ITO stripes serve as anode for 8 OLED pixels. In a next step according to the method, layers of EL 111 made of polymer layers may be applied according to the method, as follow: First, a 10 nm thin hole injection layer, poly(3,4-ethylenedioxythiophene) doped with poly(styrenesulfonate) PEDOT:PSS, may be deposited by spin coating. A self-adhesive polymer film may be used to mask those areas of the substrate that are not to be covered by the polymer films. After deposition, the PEDOT:PSS may be annealed at 100° C. during 1 hour. Then EL 111 being a 50 nm thick polymer layer may be deposited and patterned by ink-jet printing. As electroluminescent polymer a 5:22:26:47 by weight ratio of iridium (III) tris(2-(4-totyl)pyridinato-N,$C^2$), PBD=2-tert-butylphenyl-5-biphenyl-1,3,4-oxadiazol, PVK=poly (N-vinylcarbazole)), and TPD=NNN'N'-tetramethyl-p-phenylenediamine may be used. The iridium complex incorporates or embodies sources 115 of this blend, which emits in the green-yellow with peak wavelength at approximately 510 nm. In a final step according to the method, the cathode (ET 113) may be deposited by physical vapor deposition through a shadow mask defining pixels measuring approximately 3 mm×2 mm. An approximately 5 nm barium layer capped with a 70 nm aluminum layer serves as the cathode. Due to the careful registration procedure of the shadow mask the relevant edges of the different layers of the OLED are aligned with better than 100 μm accuracy. A pixel of the device may be excited or driven by applying a voltage between the cathode and anode of LS 110.

Figure 7:
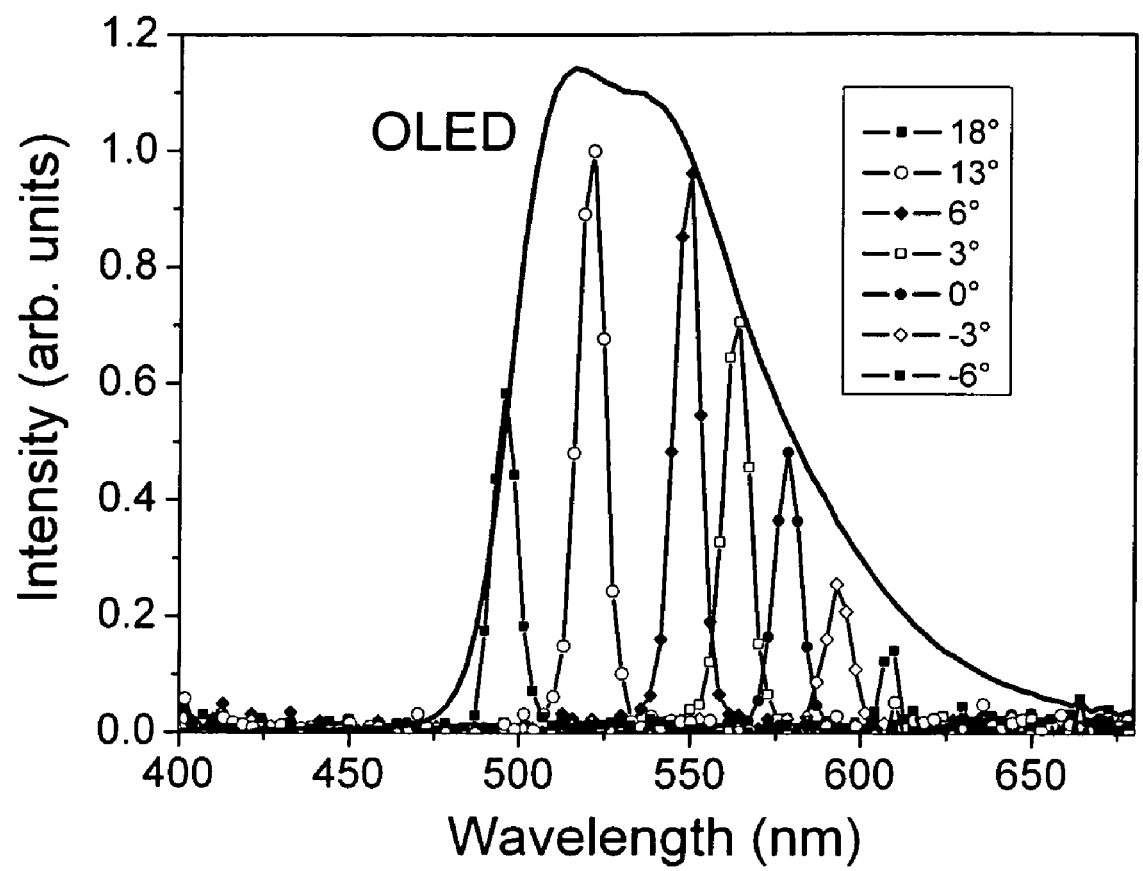
FIG. 7 shows a graph schematically illustrating the operating spectrum of the luminescent source, as well as graphs schematically illustrating spectra of out-coupled light at different out-coupling angles α, the out-coupled light originating from light emitted from the luminescent source, according to the embodiment of FIG. 5B.

Further referring now to FIG. 7, the color of light emitting from optical device 500B may shift from red for small negative out-coupling angles α to green-bluish within a narrow range of angles of about 20°. (Negative values of α indicate that the in-plane wave vector changes sign when the light is diffracted by the grating.). As expected for optical device 500B, the spectra of the out-coupled light show a strong dependency on the out-coupling angle α. The peak wavelength may shift from about 610 nm for small negative angles to below 500 nm for angles close to 20°. For the example given here coupling efficiencies—i.e. the total optical power coupled into waveguide modes divided by the total optical power emitted by the OLED—of a few percent were achieved.

Figure 8:
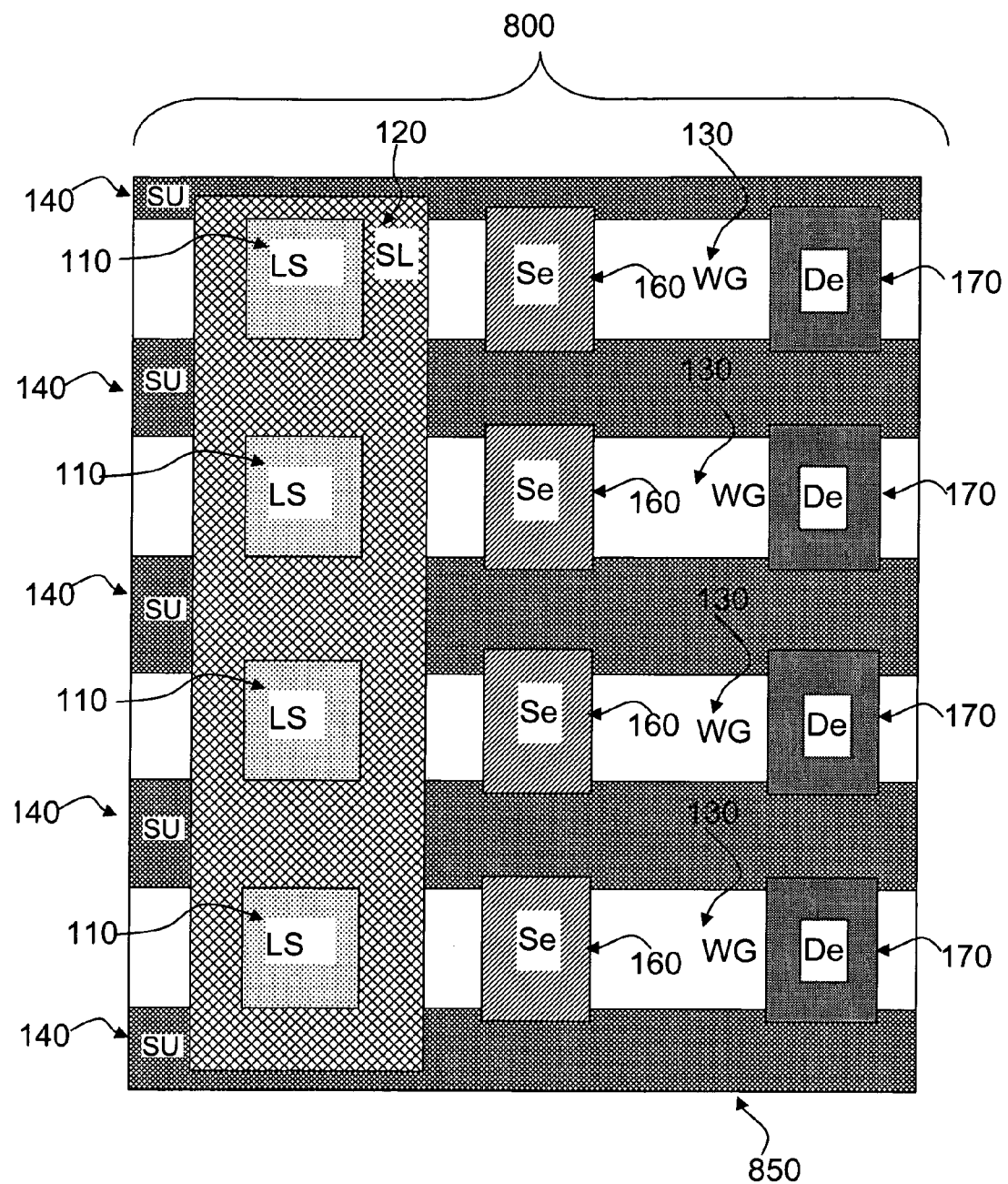
FIG. 8 is a schematic block diagram illustration of a top view of at least one integrated optical device, according to some embodiments of the invention.

Reference is now made to FIG. 8. An optical device according to each of the embodiments of the invention, may be integrated into an optical system 800. Optical system 800 may include at least one luminescent source (e.g., LS 110) substantially aligned on SL 120, which may be mechanically coupled to a structure 850 comprising of at least one SU 140 and at least one low-order mode waveguide(s) (e.g., WG 130), whereby in case that more than one waveguide is provided onto SU 140, such waveguides may be spaced apart from each other. Optical system 800 may further include at least one sensing area (SE) 160 and at least one detector (DE) 170, whereby the at least one SE 160 and detector 170 are substantially aligned with respect to LS 110. It should be noted that an optical system may not necessarily comprise the at least one SL 120.

At SE 160 light may interact in WG 130 with a respective specimen (not shown). Further, DE 170 may be adapted to measure the intensity and the spectral distribution—and thus specimen-induced changes thereof—of light propagating in the respective waveguide (e.g., WG 130, WG 133).

An optical system 800 comprising one or more optical devices 100 offer many advantages over systems known in the art, which rely on one or more external light sources, such as laser diodes for example.

First, the integrated solution provided by optical system 800 allows substantial savings in space requirements since a) no bulky external light sources are needed and b) the proposed luminescent sources (LS 110) are extremely thin and may have in some embodiments of the invention a thickness of only a few micrometers. In some preferred embodiments of the invention, LS 110 may have a thickness of less than 1 μm.

Second, no fault-prone and time-consuming procedures for the precise alignment of external light sources are necessary as required by optical systems and devices known in art.

Third, optical system 800 facilitates the integration of a plurality of LS 110 having different operational specifications. For example, a first and a second LS 110 may emit light having respectively different wavelengths $\lambda_1$ and $\lambda_2$. Therefore, a highly parallel integrated optical system, such as optical system 800, comprising of an array of monolithically integrated LS 110 can be realized. In some embodiments of the invention, a plurality of LS 110 may be fabricated by additive print technologies such as for example, ink-jet or gravure printing, which is state-of-the-art in the field of OLEDs (cf. B.-J. de Gans et al., Inkjet Printing of Polymers: State of the Art and Future Developments, Advanced Materials 16, p. 203, 2004, which is incorporated herein by reference in its entirety, hereinafter referred to as "Gans et al.").

The fabrication methods described, inter alia, by Gans et al., allow the deposition of a variety of LS 110 on a substrate (e.g., waveguide, spacer layer) in accordance to respective predefined locations. In addition, the fabrication methods enable juxtaposing neighboring LS 110 at a distance of a few µm from each other. For example, a lateral resolution of a few µm of a matrix of a plurality of identical or various LS 110, is achievable.

Fourth, each of the LS 100 described herein are compatible with flexible substrates, thus enabling fully integrated optical systems on a polymer basis.

Fifth, due to a combination of the above reasons, optical system 800 offers the potential to be fabricated in a cost-effective way. The reasons therefore are, for example: Polymeric substrates may be used instead of glass substrates, (high-volume) print processes may be used instead of standard processes such as vacuum deposition methods and photolithographic patterning, no external light sources are needed and external light sources do not have to be integrated in a cost-intensive packaging step to fabricate optical system 800.

Due to the advantages described herein, optical device 100 as well as optical system 800 may be used in association with a wide range of applications, including medical diagnostics, automotive (e.g. rain sensor), industrial (e.g. gas sensor) and information technologies. A prototypical application is a low-cost, disposable, card-type, multiple-channel fully integrated optical biosensor for point-of-care diagnostics.

In some embodiments of the invention, SL 120 may be made of any suitable material. Non-limiting examples of materials of which SL 120 may be made of, for example, $SiO_2$, $Al_2O_3$, poly(2,2,2-trifluoroethyl methacrylate), poly(2,3,3,3-pentafluoropropyl methacrylate), poly(1,1,1,3,3,3-hexafluoroisopropyl acrylate, poly(1,1,2,4,4,5,5,6,7,7-decafluoro-3-oxa-1,6-heptadiene), poly(2,2,2-trifluoroethyl acrylate), poly(2,2,3,3,3-pentafluoropropyl acrylate), poly(2,2,3,3,4,4,4-heptafluorobutyl acrylate), poly(2,2,3,3,4,4,4-heptafluorobutyl methacrylate), poly(2,2,3,3-tetrafluoropropyl methacrylate), poly(2,2,3,3-tetrafluoropropyl acrylate), poly(2,2,3,4,4,4-hexafluorobutyl acrylate), poly(2,2,3,4,4,4-hexafluorobutyl methacrylate), poly[4,5-difluoro-2,2-bis(trifluoromethyl)-1,3-dioxole-co-tetrafluoroethylene]dioxole, poly(1,1,1,3,3,3-hexafluoroisopropyl methacrylate-co-glycidyl methacrylate)glycidyl methacrylate, poly(1,1,1,3,3,3-hexafluoroisopropyl methacrylate), poly(1,1,1,3,3,3-hexafluoroisopropyl ethacrylate-co-glycidyl methacrylate) glycidyl methacrylate, poly(2,2,2-trifluoroethyl methacrylate-co-glycidyl methacrylate)glycidyl methacrylate, poly(2,2,3,3,3-pentafluoropropyl methacrylate-co-glycidyl methacrylate)glycidyl methacrylate, poly(2,2,3,3,4,4,4-heptafluorobutyl methacrylate-co-glycidyl methacrylate glycidyl methacrylate, poly(2,2,3,3-tetrafluoropropyl methacrylate-co-glycidyl methacrylate)glycidyl methacrylate, poly(2,2,3,4,4,4-hexafluorobutyl methacrylate-co-glycidyl methacrylate)glycidyl methacrylate, poly(2,2,3,3-tetrafluoropropyl methacrylate-co-glycidyl methacrylate)glycidyl methacrylate, poly(2,2,2-trifluoroethyl methacrylate), poly (2,2,2-trifluoroethyl methacrylate-co-glycidyl methacrylate) glycidyl methacrylate, poly(2,2,3,3,3-pentafluoropropyl methacrylate), poly(2,2,3,3,3-pentafluoropropyl methacrylate-co-glycidyl methacrylate), poly(2,2,3,3,4,4,4-heptafluorobutyl methacrylate), poly(2,2,3,3,4,4,4-heptafluorobutyl methacrylate-co-glycidyl methacrylate glycidyl methacrylate, poly(2,2,3,3-tetrafluoropropyl methacrylate), poly(2,2,3,3-tetrafluoropropyl methacrylate-co-glycidyl methacrylate)glycidyl methacrylate, poly(2,2,3,4,4,4-hexafluorobutyl methacrylate), poly(2,2,3,4,4,4,-hexafluorobutyl methacrylate-co-glycidyl methacrylate)glycidyl methacrylate, poly (pentafluorostyrene), poly(pentafluorostyrene-co-glycidyl methacrylate)glycidyl methacrylate, poly(tert-butyl methacrylate-co-glycidyl methacrylate)glycidyl methacrylate, poly(methyl methacrylate), polycarbonate, cyclo olefin copolymers (COCs) or sol-gel materials or any combination of the above.

In some embodiments of the invention, WG 130 may be made of any suitable material. For example, WG 130 may be made of a dielectric material having a relatively high index of refraction. Non-limiting examples of materials of which WG 130 may be made of include $Ta_2O_5$, $TiO_2$, $HfO_2$, $SiO_xN_y$, poly(1-naphthyl methacrylate), poly(1-naphthyl methacrylate-co-glycidyl methacrylate)glycidyl methacrylate, poly(2,4,6-tribromophenyl methacrylate), poly(2,4,6-tribromophenyl methacrylate-co-glycidyl methacrylate)glycidyl methacrylate, poly(2,6-dichlorostyrene), poly(2-chlorostyrene), poly(2-vinylthiophene), poly(bis(4-iodophenoxy) phosphazene), poly(N-vinylphthalimide), poly(pentabromobenzyl acrylate), poly(pentabromobenzyl methacrylate), poly(pentabromobenzyl methacrylate-co-glycidyl methacrylate)glycidyl methacrylate, poly(pentabromophenyl acrylate), poly(pentabromophenyl acrylate-co-glycidyl methacrylate)glycidyl methacrylate, poly(pentabromophenyl methacrylate), poly(pentabromophenyl methacrylate-co-glycidyl methacrylate)glycidyl methacrylate, poly(pentachlorophenyl methacrylate), poly(vinyl phenyl sulfide), and poly(vinyl phenyl sulfide-co-glycidyl methacrylate)glycidyl methacrylate. To ensure wave-guiding, the top layer of the substrate (SU) that supports the waveguide comprises a dielectric material of refractive index lower than the one of the waveguide. Additionally, said layer should have low optical losses. The said top layer of the substrate comprises either an inorganic oxide or a polymer. Preferred materials for this said top layer are $SiO_2$, barium crown glass, boro-silicate crown glass, crown glass, flint glass, fused quartz, $Al_2O_3$, poly(2,2,2-trifluoroethyl methacrylate), poly(2,2,3,3,3-pentafluoropropyl methacrylate), poly(1,1,1,3,3,3-hexafluoroisopropyl acrylate, poly(1,1,2,4,4,5,5,6,7,7-decafluoro-3-oxa-1,6-heptadiene), poly(2,2,2-trifluoroethyl acrylate), poly (2,2,3,3,3-pentafluoropropyl acrylate), poly(2,2,3,3,4,4,4-heptafluorobutyl acrylate), poly(2,2,3,3,4,4,4-heptafluorobutyl methacrylate), poly(2,2,3,3-tetrafluoropropyl methacrylate), poly(2,2,3,3-tetrafluoropropyl acrylate), poly(2,2,3,4,4,4-hexafluorobutyl acrylate), poly(2,2,3,4,4,4-hexafluorobutyl methacrylate), poly[4,5-difluoro-2,2-bis(trifluoromethyl)-1,3-dioxole-co-tetrafluoroethylene]dioxole, poly(1,1,1,3,3,3-hexafluoroisopropyl methacrylate-co-glycidyl methacrylate)glycidyl methacrylate, poly(1,1,1,3,3,3-hexafluoroisopropyl methacrylate), poly(1,1,1,3,3,3-hexafluoroisopropyl methacrylate-co-glycidyl methacrylate)glycidyl methacrylate, poly(2,2,2-trifluoroethyl methacrylate-co-glycidyl methacrylate)

glycidyl methacrylate, poly(2,2,3,3,3-pentafluoropropyl methacrylate-co-glycidyl methacrylate)glycidyl methacrylate, poly(2,2,3,3,4,4,4-heptafluorobutyl methacrylate-co-glycidyl methacrylate glycidyl methacrylate, poly(2,2,3,3-tetrafluoropropyl methacrylate-co-glycidyl methacrylate) glycidyl methacrylate, poly(2,2,3,4,4,4-hexafluorobutyl methacrylate-co-glycidyl methacrylate)glycidyl methacrylate, poly(2,2,3,3-tetrafluoropropyl methacrylate-co-glycidyl methacrylate)glycidyl methacrylate, poly(2,2,2-trifluoroethyl methacrylate), poly(2,2,2-trifluoroethyl methacrylate-co-glycidyl methacrylate)glycidyl methacrylate, poly(2,2,3,3,3-pentafluoropropyl methacrylate), poly(2,2,3,3,3-pentafluoropropyl methacrylate-co-glycidyl methacrylate), poly(2,2,3,3,4,4,4-heptafluorobutyl methacrylate), poly(2,2,3,3,4,4,4-heptafluorobutyl methacrylate-co-glycidyl methacrylate glycidyl methacrylate, poly(2,2,3,3-tetrafluoropropyl methacrylate), poly(2,2,3,3-tetrafluoropropyl methacrylate-co-glycidyl methacrylate)glycidyl methacrylate, poly(2,2,3,4,4,4-hexafluorobutyl methacrylate), poly(2,2,3,4,4,4,-hexafluorobutyl methacrylate-co-glycidyl methacrylate)glycidyl methacrylate, poly(pentafluorostyrene), poly(pentafluorostyrene-co-glycidyl methacrylate)glycidyl methacrylate, poly(tert-butyl methacrylate-co-glycidyl methacrylate)glycidyl methacrylate, poly(methyl methacrylate), polycarbonate, cyclo olefin copolymers (COCs) or sol-gel materials or any combination of the above.

ET 112 may be made of indium thin oxide (ITO), zinc oxide (ZnO), especially In or Al doped ZnO, tin oxide ($SnO_2$), especially Sb and F doped $SnO_2$, gold, silver, nickel, poly(3,4-ethylenedioxythiophene)poly(styrenesulfonate), polyanyline, polyacetylene and polypyrrole. ET 113 may be made of calcium, barium, lithium fluoride, aluminum and silver. EL 111 may be made of poly[2-methoxy-5-(2-ethylhexyl-oxy)-1,4-phenylene-vinylene], poly[2,5-bis(3,7-dimethyloctyloxy)-1,4-phenylene-vinylene], poly[2-methoxy-5-(3,7-dimethyl-octyloxy)-1,4-phenylenevinylene], poly(9,9-dioctylfluorenyl-2,7-diyl), poly[9,9-di-(2-ethylhexyl)-fluorenyl-2,7-diyl], poly(9,9-di{2-[2-(2-methoxy-ethoxy)ethoxy]ethyl}fluorenyl-2,7-diyl), poly[2-(6-cyano-6-methyl-heptyloxy)-1,4-phenylene], poly(2,5-dioctyl-1,4-phenylene), poly[9,9-di-(2-ethylhexyl)-fluorenyl-2,7-diyl], poly[(9,9-dioctyl-2,7-divinylene-fluorenylene)-alt-co-{2-methoxy-5-(2-ethyl-hexyloxy)-1,4-phenylene}], poly[(9,9-dioctylfluorenyl-2,7-diyl)-co-(1,4-vinylenephenylene)], poly[9,9-dioctylfluorenyl-2,7-diyl)-co-1,4-benzo-{2,1'-3}-thiadiazole)], poly[(9,9-dihexylfluorenyl-2,7-diyl)-alt-co-(2-methoxy-5-{2-ethylhexyloxy}-1,4-phenylene)], poly[(9,9-dihexylfluorenyl-2,7-diyl)-co-(2,5-p-xylene)], poly[(9,9-di(3,3'-N,N'-trimethyl-ammonium)propylfluorenyl-2,7-diyl)-alt-(9,9-dioctylfluorenyl-2,7-diyl)]diiodide salt, poly [(9,9-dioctylfluorenyl-2,7-diyl)-co-(N,N'-diphenyl)-N,N'di (p-butyl-oxy-phenyl)-1,4-diaminobenzene)], poly[(9,9-dioctylfluorenyl-2,7-diyl)-co-(1,4-benzo-{2,1',3}-thiadiazole)], 4,4'-bis(9-ethyl-3-carbazo-vinylene)-1,1'-biphenyl, 9,10-Bis[(9-ethyl-3-carbazoyl)-vinylenyl]-anthracene, 4,4-bis(diphenylvinylenyl)-biphenyl, 1,4-bis(9-ethyl-3-carbazo-vinylene)-2-methoxy-5-(2-thylhexyloxy)-benzene, 4,4'bis(diphenylvinylenyl)-anthracene, 1,4-bis(9-ethyl-3-carbazo-vinylene)-9,9-dihexyl-fluorene, 9,9,9',9',9''',9'''-hexakis(hexyl)-2,7';2',7''-trifluorene, 9,9,9',9',9'',9''-hexakis(octyl)-2,7',2',7''-trifluorene, 9,9,9',9',9'',9'',9''',9'''-decakis(hexyl)-2,7'; 2',7'', 2'',7''';2',7'''-pentafluorene, 9,9,9',9',9'',9'',9''',9''',9'''',9''''-dodecakis(hexyl)-2,7';2',7'',2'',7''';2''',7'''',2'''',7''''-heptafluorene, 3,7-bis-(9,9-di-n-hexylfluoren-2-yl)-dibenzothiophene-S,S-dioxide, 3,7-Bis[7-(9,9-di-n-hexylfluoren-2-yl)]-9,9-di-n-hexylfluoren-2-yl] dibenzothiophene-S,S-dioxide, 2,7-Bis[7-(9,9-di-n-hexylfluoren-2-yl)dibenzothiophene-S,S-dioxide-3-yl]-9,9-di-n-hexylfluorene, lithium tetra(2-methyl-8-hydroxyquinolinato)boron, lithium tetra(8-hydroxyquinolinato)boron, bis(8-hydroxyquinolinato)zinc, bis(2-methyl-8-hydroxy-quinolinato)zinc, tris(benzoylacetonato)mono-(phenanathroline)europium, tris(dibenzoylmethane)mono-(phenanthroline)europium(III), tris (dibenzoylmethane)-mono(5-aminophenanthroline) europium (III), Tris(dinaphtoylmethane)-mono (phenanthroline)europium (III), tris(dibiphenoylmethane)-mono(phenanthroline)europium (III), tris (dibenzoylmethane)-mono(4,7-diphenylphenanthroline)-europium (III), tris[di(4-(2-(2-ethoxyethoxy)ethoxy) benzoylmethane]]mono(phenanthro-line)europium (III), tris (2-phenylpyridine)iridium (III), tris(8-hydroxyquinolato)-aluminum (III), tris(8-hydroxyquinolato)gallium (III), platinum (III) [2(4,6-difluorophenyl)pyridinato-N,C2)-(acetyl-acetonate), iridium (III) bis(2-(4,6-difluorephenyl) pyridinato-N,C2), iridium (III) tris(2-(4-totyl)pyridinato-N,C2), iridium (III) bis(2-(2'-benzo-thienyl)pyridinatoN,C3') (acetyl-acetonate), tris(1-phenylisoquinoline) iridium (III), bis(1-phenylisoquinoline)-(acetylacetonate) iridium (III), tris(2-(2,4-difluorophenyl)pyridine)iridium (III), iridium(III) bis(2-methyldibenzo-[f,h]quinoxaline)(acetylacetonate), bis (2-(9,9-dibutylfluorenyl)-1-isoquinoline(acetylacetonate), bis(2-(9,9-dihexylfluorenyl)-1-pyridine)(acetylacetonate) iridium(III), Tris(3-methyl-1-phenyl-4-trimethyl-acetyl-5-pyrazoline)terbium(III), dichlorotris(1,10-phenanthroline) ruthenium(II) and rubrene.

The charge transport layers (not shown) may be made of any suitable material such as, for example, N,N'-bis(3-methylphenyl)-N,N'-bis(phenyl)benzidine, N'N'-bis(4-methylphenyl)-N,N'-bis(phenyl)benzidine, N,N'-bis(2-naphtalenyl)-N-N'-bis(phenylbenzidine), 1,3,5-tris(3-methyldiphenyl-amino)benzene, N,N'-bis(1-naphtalenyl)-N-N'-bis(phenylbenzidine), 4,4',4'''-tris(N,N-phenyl-3-methylphenylarnino)triphenylamine, 4,4',N,N'-diphenylcarbazole, poly[(9,9-dihexylfluorenyl-2,7-diyl)-co-(N,N'bis{p-butylphenyl}-1,4-diamino-phenylene)], poly[9,9-dioctylfluorenyl-2,7-dyil)-co-(N,N'bis(4-butylphenyl-1,1'-bipheny-lene-4,4-diamine)], poly(N,N'-bis(4-butylphenyl)-N,N'-bis(phenyl)benzidine, 2-(4-biphenylyl)-5-phenyl-1,3,4-oxadiazole, 2-(4-tert-Butylphenyl)-5-(4-biphenylyl)-1,3,4-oxadiazole, 3,5-bis(4-tert-butylphenyl)-4-phenyl-4H-1,2,4-triazole, 3-(biphenyl-4-yl)-5-(4-tert-butylphenyl)-4-phenyl-4H-1,2,4-triazole, bathocuproine, bathophenanthroline, tris(8-hydroxyquinolato)-aluminum (III), poly(3,4-ethylenedioxythiophene)poly(styrenesulfonate), polyanyline, polyacetylene and polypyrrole.

EL 111 may be made of, for example, ZnS, ZnSe, SrS, and GaN doped with rare earth or transition metal ions (ZnS:Mn, SrS:Cu, GaN:Er).

The insulating layer (not shown) may be made of, for example, barium titanate, $SiO_2$, $Al_2O_3$, poly(2,2,2-trifluoroethyl methacrylate), poly(2,2,3,3,3-pentafluoropropyl methacrylate), poly(1,1,1,3,3,3-hexafluoroisopropyl acrylate, poly(1,1,2,4,4,5,5,6,7,7-decafluoro-3-oxa-1,6-heptadiene), poly(2,2,2-trifluoroethyl acrylate), poly(2,2,3,3,3-pentafluoropropyl acrylate), poly(2,2,3,3,4,4,4-heptafluorobutyl acrylate), poly(2,2,3,3,4,4,4-heptafluorobutyl methacrylate), poly(2,2,3,3-tetrafluoropropyl methacrylate), poly(2,2,3,3-tetrafluoropropyl acrylate), poly(2,2,3,4,4,4-hexafluorobutyl acrylate), poly(2,2,3,4,4,4-hexafluorobutyl methacrylate), poly[4,5-difluoro-2,2-bis(trifluoromethyl)-1,3-dioxole-co-tetrafluoroethylene]dioxole, poly(1,1,1,3,3,3-hexafluoroisopropyl methacrylate-co-glycidyl methacrylate)glycidyl methacrylate, poly(1,1,1,3,3,3-hexafluoroisopropyl methacrylate), poly(1,1,1,3,3,3-hexafluoroisopropyl methacrylate-co-glycidyl methacrylate)glycidyl methacrylate, poly(2,2,2-trifluoroethyl methacrylate-co-glycidyl methacrylate) glycidyl methacrylate, poly(2,2,3,3,3-pentafluoropropyl methacrylate-co-glycidyl methacrylate)glycidyl methacrylate, poly(2,2,3,3,4,4,4-heptafluorobutyl methacrylate-co-glycidyl methacrylate glycidyl methacrylate, poly(2,2,3,3-tetrafluoropropyl methacrylate-co-glycidyl methacrylate) glycidyl methacrylate, poly(2,2,3,4,4,4,-hexafluorobutyl methacrylate-co-glycidyl methacrylate)glycidyl methacrylate, poly(2,2,3,3-tetrafluoropropyl methacrylate-co-glycidyl methacrylate)glycidyl methacrylate, poly(2,2,2-trifluoroethyl methacrylate), poly(2,2,2-trifluoroethyl methacrylate-co-glycidyl methacrylate)glycidyl methacrylate, poly(2,2,3,3,3-pentafluoropropyl methacrylate), poly(2,2,3,3,3-pentafluoropropyl methacrylate-co-glycidyl methacrylate), poly(2,2,3,3,4,4,4-heptafluorobutyl methacrylate), poly(2,2,3,3,4,4,4-heptafluorobutyl methacrylate-co-glycidyl methacrylate glycidyl methacrylate, poly(2,2,3,3-tetrafluoropropyl methacrylate), poly(2,2,3,3-tetrafluoropropyl methacrylate-co-glycidyl methacrylate)glycidyl methacrylate, poly(2,2,3,4,4,4-hexafluorobutyl methacrylate), poly(2,2,3,4,4,4,-hexafluorobutyl methacrylate-co-glycidyl methacrylate)glycidyl methacrylate, poly(pentafluorostyrene), poly(pentafluorostyrene-co-glycidyl methacrylate)glycidyl methacrylate, poly(tert-butyl methacrylate-co-glycidyl methacrylate)glycidyl methacrylate, poly(methyl methacrylate), polycarbonate, cyclo olefin copolymers (COCs), or sol-gel materials.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described, but by the appended claims and their legal equivalents. Therefore, it should be understood that alternatives, modifications, and variations of the present invention are to be construed as being within the scope of the appended claims.

The invention claimed is:

1. An optical device able to luminesce, said optical device comprising:
   a luminescent source;
   a low-order mode waveguide; and
   a substrate,
   said waveguide being mechanically coupled to said substrate,
   wherein said luminescent source is directly or indirectly mechanically and evanescently coupled to said waveguide such that the distance D between point sources of said luminescent source and said waveguide is equal to or smaller than the decay length of the exponential tails of the modes supported by said waveguide WG, thereby ensuring that said luminescent source and said low-order mode waveguide are optically coupled.

2. The optical device of claim 1, further comprising a spacer layer sandwiched between said luminescent source and said waveguide to reduce modal loss of light propagating in the part of said waveguide that is located underneath said luminescent source.

3. The optical device of claim 1, wherein said distance D is equal or smaller than 5 µm; preferably equal or smaller than 500 nm; and more preferably equal or smaller than 150 nm.

4. The optical device of claim 2, wherein said luminescent source is monolithically integrated either with said waveguide or with said spacer layer.

5. The optical device of claim 1, wherein the thickness of said waveguide ranges from 10 nm to 10 µm; preferably from 50 nm to 1 µm; and more preferably from 100 nm to 500 nm.

6. The optical device of claim 2, wherein the thickness of said spacer layer ranges from 5 nm to 5 µm; preferably from 10 nm to 300 nm; and more preferably from 20 nm to 150 nm.

7. The optical device of claim 1, wherein the thickness of said luminescent source is equal or smaller than 100 µm, preferably equal or smaller than 10 µm; and more preferably equal or smaller than 1 µm.

8. The optical device of claim 1, wherein said low-order mode refers to less than 20 modes; and preferably to less than 5 modes.

9. The optical device of claim 1, wherein said waveguide comprises one or more grating structure.

10. The optical device of claim 1, wherein the coupling of efficiency between said luminescent source and said waveguide is equal to or at least 3%, and preferably equal to or at least 10%.

11. An optical system comprising at least one luminescent source that is evanescently mechanically coupled to a structure that comprises at least one low-order mode waveguide and at least one substrate.

12. The optical system according to claim 11, wherein at least one spacer layer is mechanically coupled to the structure and positioned between that at least one low-order mode waveguide and the at least one luminescent source.

13. The optical system according to claim 11, wherein a plurality of waveguides is provided on said substrate, the plurality of waveguides being spaced apart from each other.

14. The optical system of claim 11, further comprising at least one sensing area and at least one detector, whereby said at least one sensing area and detector are substantially aligned with respect to the at least one luminescent source, respectively.

15. A method for manufacturing an optical device, the method comprising:
   providing a substrate;
   providing a low-order mode waveguide on said substrate, wherein a luminescent source is mechanically and evanescently coupled in a direct or indirect manner to said low-order mode waveguide such that the distance D between point sources of said luminescent source and said waveguide is equal to or smaller than the decay length of the exponential tails of the modes supported by said waveguide to ensure that said luminescent source and said low-order mode waveguide are optically coupled.

16. The method according to claim 15 further comprising providing a spacer layer between said low-order mode waveguide and said luminescent source to reduce modal loss of light propagating in the part of said waveguide that is located underneath said luminescent source.

17. The method according to claim 16, further comprising providing a grating structure underneath said luminescent source or at a distance $D_{GS}$ from the outermost edge of said luminescent source and said spacer layer.

* * * * *

UNITED STATES PATENT AND TRADEMARK OFFICE
CERTIFICATE OF CORRECTION

PATENT NO. : 7,711,221 B2
APPLICATION NO. : 12/004160
DATED : May 4, 2010
INVENTOR(S) : Lukas Bürgi et al.

Page 1 of 1

It is certified that error appears in the above-identified patent and that said Letters Patent is hereby corrected as shown below:

Front page, (12), "Burgi et al." should read --Bürgi et al.--;

Front page, (75) Inventors, "Burgi" should read --Bürgi--;

Front page, (75) Inventors, "Jurgen Sochtig" should read --Jürgen Söchtig--;

Column 11, line 9, "10A)," should read --100A),--;

Column 11, line 22, "10A)," should read --100A),--;

Column 13, line 60, "ethacrylate" should read --methacrylate--; and

Column 15, line 63, reads as follows: "pentafluorene, 9,9,9',9',9'',9'', 9''',9''',9'''',9'''',9''''',  9''''''', 9'''''''-"

should read --pentafluorene, 9,9,9',9',9'',9'', 9''',9''',9'''',9'''',9''''',9''''''',9''''''', 9'''''''- --.

Signed and Sealed this
Ninth Day of August, 2011

David J. Kappos
*Director of the United States Patent and Trademark Office*